(12) United States Patent
Hossain et al.

(10) Patent No.: US 12,465,470 B1
(45) Date of Patent: *Nov. 11, 2025

(54) ORGANIC DENTAL DEVICE AND METHOD OF PREPARATION THEREOF

(71) Applicant: IMAM MOHAMMAD IBN SAUD ISLAMIC UNIVERSITY, Riyadh (SA)

(72) Inventors: ABM Sharif Hossain, Riyadh (SA); Hasan Ahmed Rudayni, Riyadh (SA); Mohammad Saad Aleissa, Riyadh (SA); Fazliny Abdul Rahman, Kuala Lumpur (MY)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/088,446

(22) Filed: Mar. 24, 2025

(51) Int. Cl.
*A61C 13/00* (2006.01)

(52) U.S. Cl.
CPC ...... *A61C 13/0006* (2013.01); *A61C 2201/00* (2013.01)

(58) Field of Classification Search
CPC ... A61C 2201/00; A61C 13/0006; C08L 1/02; C08L 3/02; A61L 2300/30; A61L 2400/12
See application file for complete search history.

(56) References Cited

U.S. PATENT DOCUMENTS

| | | |
|---|---|---|
| 2015/0209120 A1 | 7/2015 | Hannapel et al. |
| 2022/0087800 A1* | 3/2022 | Wolgin ............... A61C 19/063 |
| 2022/0162362 A1 | 5/2022 | Dorfinger et al. |
| 2022/0409335 A1 | 12/2022 | Osmani et al. |

FOREIGN PATENT DOCUMENTS

| | | |
|---|---|---|
| IN | 202341063596 A | 9/2023 |
| IN | 202331077294 A | 1/2024 |

OTHER PUBLICATIONS

M. Kusai Al-Munajed, et al., "The use of a cyanoacrylate adhesive for bonding orthodontic brackets: an ex-vivo study". Journal of Orthodontics, vol. 27, Issue 3, 2000, pp. 255-260. 4 Pages.

S. Mojtaba Amininasab, et al., "Synthesis and Characterization of New Dental Composite Containing Xanthene Based on Fish Bone Powder: Study on Anticancer and Antimicrobial Activity", Macromolecular Research, vol. 30, 2022, pp. 891-899. 9 pages.

Ali Mohammed Korsheed, et al., "Preparation and Characterization of Natural Fish Bone as an Implant Material", Journal of Medicinal and Chemical Sciences, vol. 6, Issue 3, Mar. 2023, pp. 668-676. 9 Pages.

Hina Abbas, Rabihah Alawi et al., "Characterization of reinforced hanohybrid dental composite resin made of nano silica rice husk with the reinforcement utilizing konaf fiber", Cellulose, vol. 30, 2023, pp. 9693-9708. 16 Pages.

\* cited by examiner

*Primary Examiner* — Michael G. Hartley
*Assistant Examiner* — Leah H Schlientz
(74) *Attorney, Agent, or Firm* — Oblon, McClelland, Maier & Neustadt, L.L.P.

(57) ABSTRACT

An organic dental device includes a biobased matrix including a nanocomposite, a pigment composition, an organic composition, a plasticizer mixture, an adhesive component, ZnO nanoparticles, and at least one plasticizer. The nanocomposite includes a mixture of olive seed nanocellulose, date seed nanocellulose, fish bone nanocellulose, sheep bone nanocellulose, olive seed nanostarch, date seed nanostarch, fish bone nanostarch, and sheep bone nanostarch, the organic composition includes starch, a moringa leaf extract, a chicken-sourced glycerin, fish bone powder, and sheep bone powder, the plasticizer mixture comprises polyvinyl chloride, the pigment composition comprises beetroot peel pigment, blueberry pigment and an ajwa date coating, and the adhesive component comprises a cyanoacrylate adhesive, *Acacia arabica* glue, a *Lannea* sp gum, okra gel, aloe vera gel, and jackfruit latex.

20 Claims, 6 Drawing Sheets

ORGANIC DENTAL DEVICE AND METHOD OF PREPARATION THEREOF

BACKGROUND

Technical Field

The present disclosure is directed towards a dental device, more particularly, relates to an organic dental device and a method of preparing the organic dental device.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The importance of sustainable biomaterials in dentistry has grown markedly in recent years, largely driven by rising environmental concerns, scarcity of resources, waste accumulation, and increasing demand for biocompatible materials. Sustainable biomaterials offer a wide array of benefits. They present an environmentally friendly alternative to traditional dental materials such as synthetic plastics and nonbiodegradable polymers, significantly reducing waste accumulation and the environmental footprint of dental practices Moreover, the biocompatibility of dental materials can directly minimize the risk of adverse reactions and complications cause by use of dental devices.

Conventionally, dental braces are used for correcting or maintaining the position of the teeth of the user. Use of dental braces may, however, increase risk of tooth decay, gum disease, and tooth infections by harming the enamel or irritating the gums of the user. Further, ill-fitting braces can apply uneven or excessive pressure, leading to stress on the teeth and gums, which may cause tooth sensitivity or loosening. Thus there is a need to manufacture a dental brace that may be fabricated to be durable and well-fitting while also decreasing potential adverse effects associated with use of the dental brace. Synthetic materials conventionally used in making dental braces may also pose one or more drawbacks, such as low durability, decreased mechanical strength, non-biodegradability, and increased costs. Therefore, one objective of this disclosure is to develop a dental device developed from biobased materials for medical use having increased mechanical strength and biocompatibility.

SUMMARY

In an exemplary embodiment, an organic dental device described. The organic dental device comprises a biobased preparation (matrix) comprising a nanocomposite, a pigment composition, an organic composition, an adhesive component, ZnO nanoparticles, and a plasticizer mixture. The nanocomposite comprises a mixture of olive seed nanocellulose, date seed nanocellulose, fish bone nanocellulose, sheep bone nanocellulose, olive seed nanostarch, date seed nanostarch, fish bone nanostarch, and sheep bone nanostarch. The organic composition comprises starch, a moringa leaf extract, fish bone powder, sheep bone powder, and a chicken-sourced glycerin. The adhesive component comprises a cyanoacrylate adhesive, *Acacia arabica* glue, a *Lannea* sp gum, okra gel, aloe vera gel, and jackfruit latex. The plasticizer mixture comprises polyvinyl chloride. The pigment composition comprises beetroot peel pigment, blueberry pigment, and an ajwa date coating. The dental device has a molded structure in the form of a dental arch having a plurality of impressions and/or pockets to conform to teeth of a subject. The biobased matrix comprises nanoparticles having an average particle size of 20 nm or less.

In some embodiments, the plasticizer mixture further comprises least one selected from the group consisting of diisononyl phthalate (DINP), diisodecyl phthalate (DIDP), di(2-ethylhexyl) phthalate (DEHP), polypropylene glycol dibenzoate (PGDB), epoxidized soybean oil (ESBO), and polyvinyl chloride (PVC).

In some embodiments, the nanocomposite comprises 15 to 35 wt. % date seed nanocellulose and date seed nanostarch relative to a total weight of the nanocomposite.

In some embodiments, the nanocomposite comprises 10 to 30 wt. % olive seed nanocellulose and olive seed nanostarch relative to a total weight of the nanocomposite.

In some embodiments, the organic dental device has a tensile strength of 85 MPa/kg·m$^3$ or more.

In some embodiments, the organic dental device has a tensile modulus of 1.5 GPa or more.

In some embodiments, the biobased matrix comprises nanoparticles having an average particle size of 16 nm or less.

In some embodiments, the organic dental device has a tensile strength of 95 MPa/kg·m$^3$.

In some embodiments, the organic dental device has a tensile modulus of 1.65 GPa.

In some embodiments, the nanocomposite comprises nanostarch having an average particle size of 16 nm or less.

In some embodiments, the pigment composition has an amount of carotine of 2 to 4 mg/L.

In some embodiments, the pigment composition has an amount of anthocyanin of 3 to 6 mg/L.

In an exemplary embodiment, a method of preparing the organic dental device is described. The method comprises hydrolyzing a mixture of olive seed, date seed, fish bone, and sheep bone with at least one inorganic acid to obtain the nanocomposite, preparing ZnO nanoparticles, then combining the nanocomposite with the organic composition, the ZnO nanoparticles, the adhesive component, the pigment composition, and the plasticizer mixture to form the biobased matrix; pressing the biobased matrix into a mold; and curing to form the organic dental device.

In some embodiments, the inorganic acid is at least one selected from the group consisting of hydrochloric acid, nitric acid, hydrobromic acid, sulfuric acid, hydrofluoric acid, and phosphoric acid.

In some embodiments, the inorganic acid is sulfuric acid and nitric acid.

In some embodiments, the method further comprises drying the olive seed, the date seed, the fish bone, and the sheep bone at a temperature of 125 to 145° C. for 1 to 4 h to obtain a mixture comprising nanocellulose and nanostarch of olive seed, date seed, fish bone, and sheep bone.

In some embodiments, the ZnO nanoparticles have an average particle size of 20 nm or less.

In some embodiments, the curing is photocuring or thermal curing.

In some embodiments, the curing comprises curing with a photocuring device for 10 to 30 seconds at a light intensity of 250 to 850 mW/cm$^2$.

In some embodiments, the curing comprises heating at a temperature of 100 to 160° C. for 3 to 6 h.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
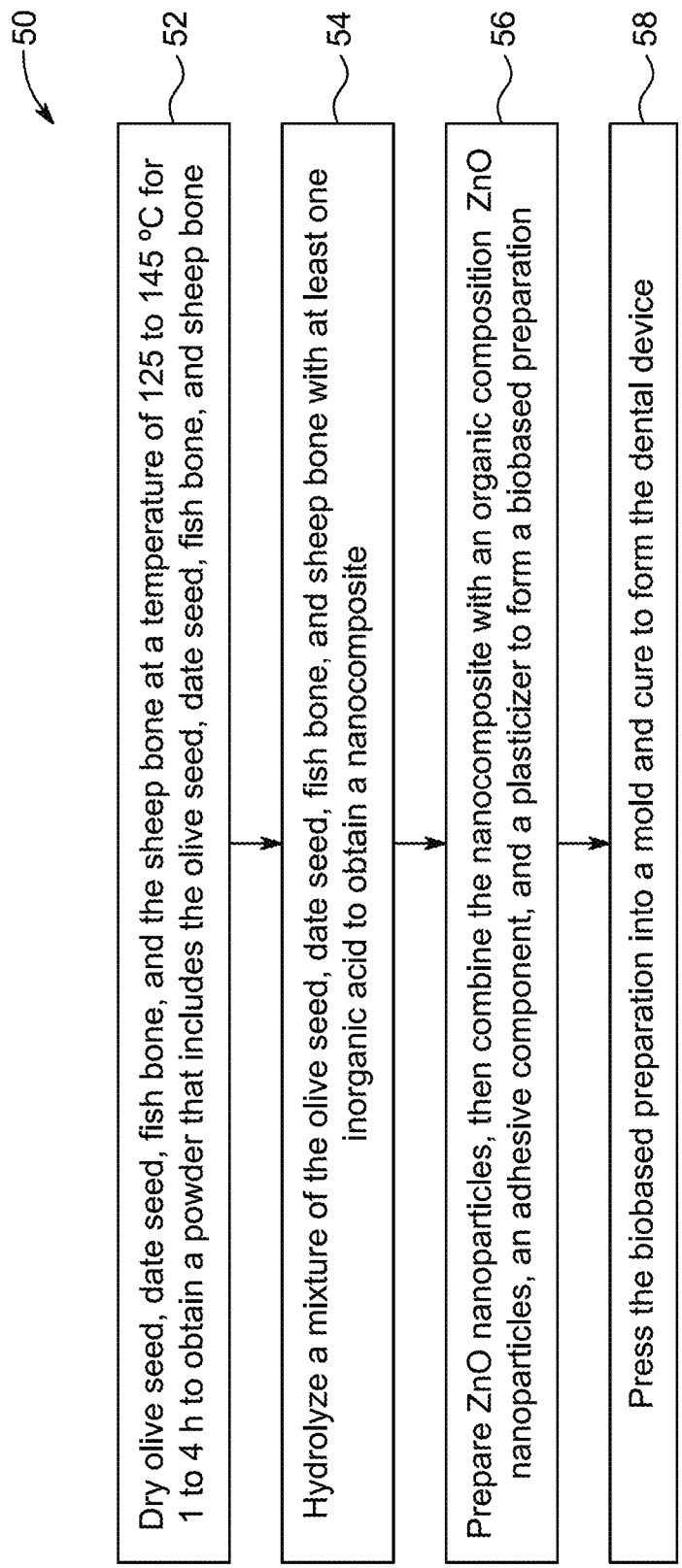
FIG. 1 is a flowchart depicting a method of preparing an organic dental device, according to certain embodiments.
Figure 2A:
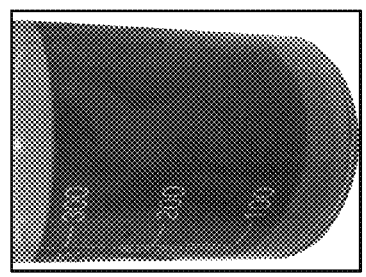
FIG. 2A is an optical image of a waste date seed, according to certain embodiments.
Figure 2B:
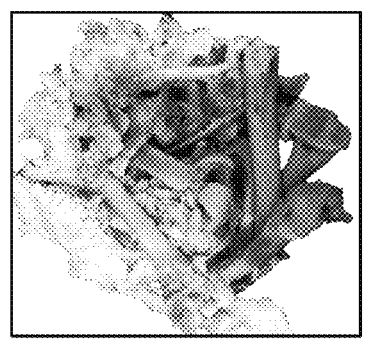
FIG. 2B is an optical image of the waste date seed ground into a powder, according to certain embodiments.
Figure 2C:
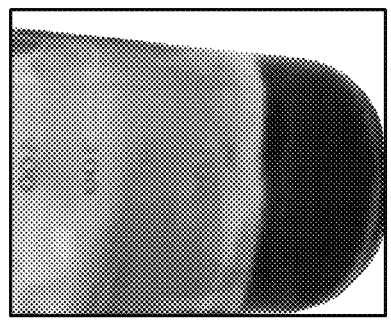
FIG. 2C is an optical image showing acid hydrolysis of the powder of the waste date seed, according to certain embodiments.
Figure 2D:
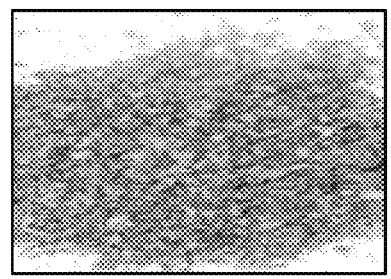
FIG. 2D is an optical image of a sheep bone, and a solution obtained on acid hydrolysis of the camel bone, according to certain embodiments.
Figure 2E:
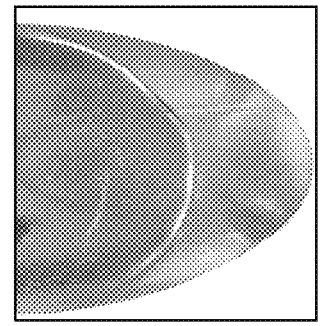
FIG. 2E is an optical image of an olive seed and its nanoparticles before wash, according to certain embodiments.
Figure 2F:
FIG. 2F is an optical image of an olive seed and its nanoparticles after wash, according to certain embodiments.
Figure 2G:
FIG. 2G is an optical image of a fish bone, according to certain embodiments.
Figure 2H:
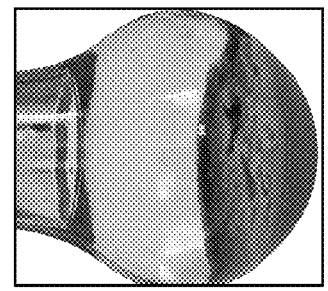
FIG. 2H is an optical image of a solution of fish bone nanoparticles, according to certain embodiments.
Figure 2L:
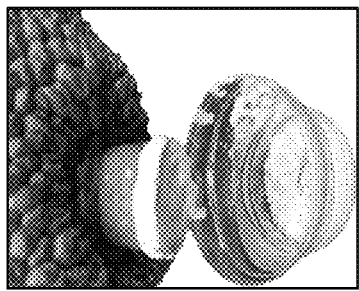
FIG. 2L is an optical image of jackfruit latex, according to certain embodiments.
Figure 2P:
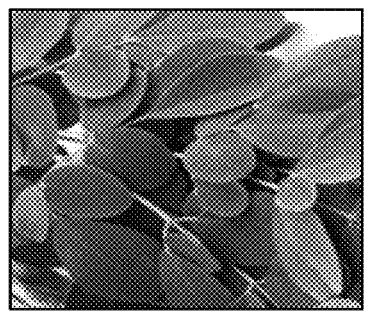
FIG. 2P is an optical image of a moringa leaf, according to certain embodiments.
Figure 2K:
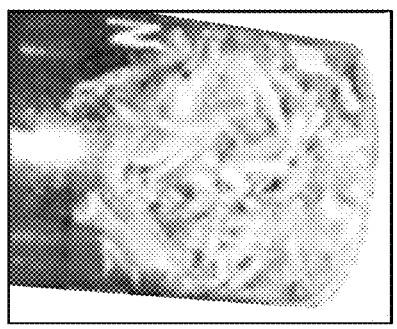
FIG. 2K is an optical image of a chicken toes, according to certain embodiments.
Figure 2O:
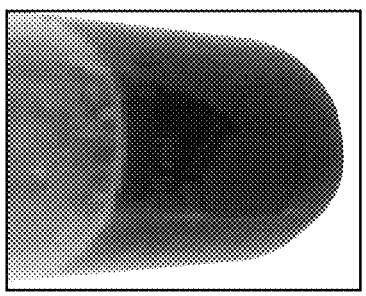
FIG. 2O is an optical image of moringa leaf extract obtained from a moringa leaf, according to certain embodiments.
Figure 2J:
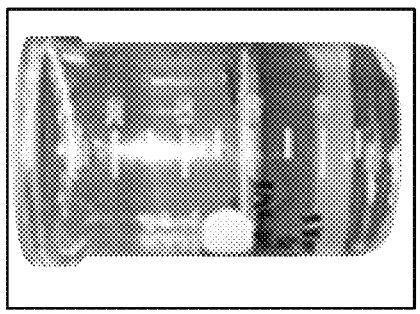
FIG. 2J is an optical image of a glycerin solution, according to certain embodiments.
Figure 2N:
FIG. 2N is an optical image of a beetroot peel, according to certain embodiments.
Figure 2I:
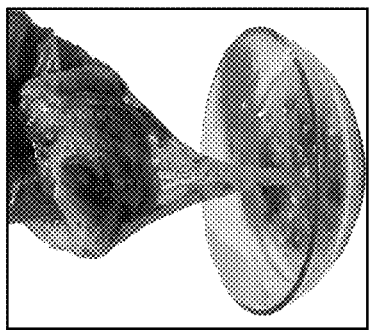
FIG. 2I is an optical image of an okra gel, according to certain embodiments.
Figure 2M:
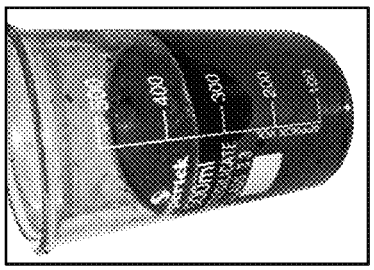
FIG. 2M is an optical image of a beetroot peel extract obtained from a beetroot peel, according to certain embodiments.
Figure 2Q:
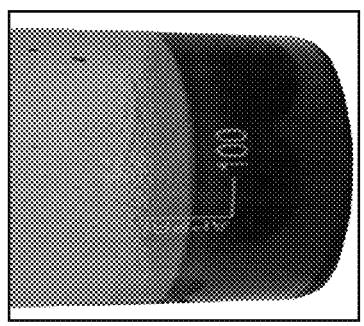
FIG. 2Q is an optical image of ajwa dates solution obtained from ajwa dates, according to certain embodiments.
Figure 2R:
FIG. 2R is an optical image of ajwa dates, according to certain embodiments.
Figure 2S:
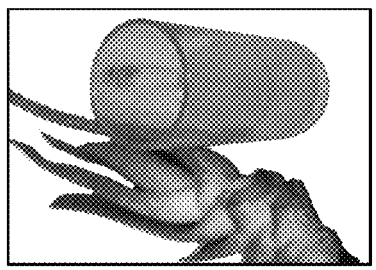
FIG. 2S is an optical image of aloe vera gel, according to certain embodiments.
Figure 2T:
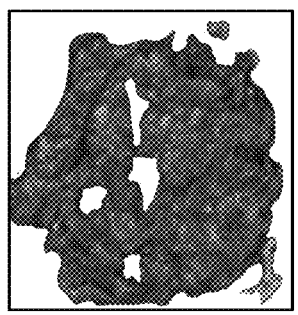
FIG. 2T is an optical image of a plasticizer mixture, according to certain embodiments.
Figure 3A:
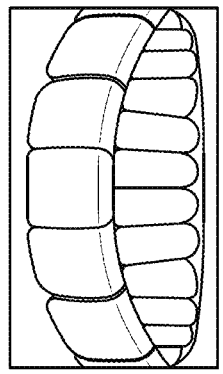
FIG. 3A through FIG. 3K are images of different organic teeth with color base dice, according to certain embodiments.
Figure 3B:
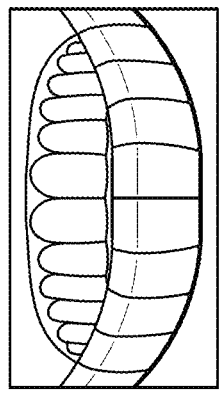
Figure 3C:
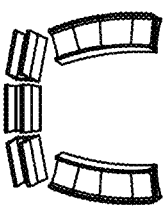
Figure 3D:
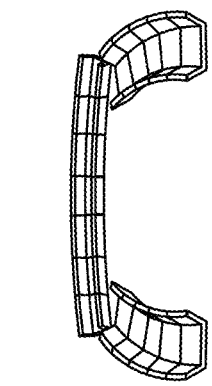
Figure 3G:
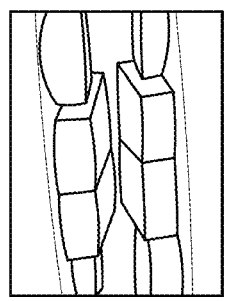
Figure 3F:
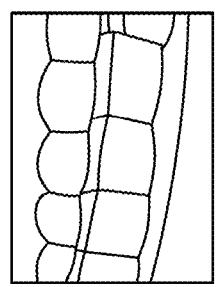
Figure 3E:
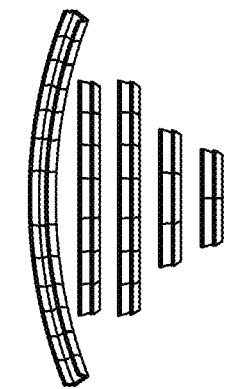
Figure 3K:
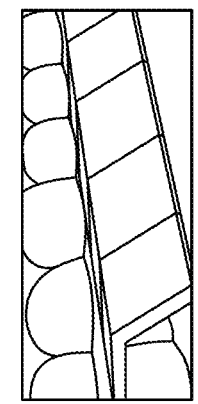
Figure 3J:
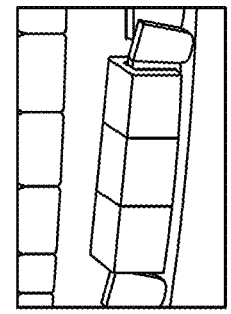
Figure 3I:
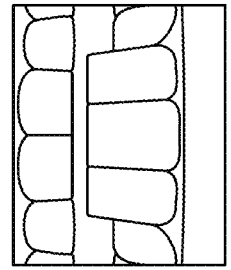
Figure 3H:
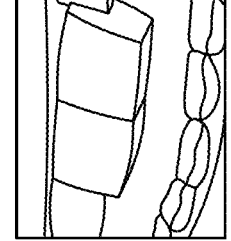
Figure 3O:
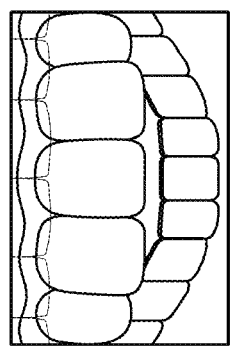
FIG. 3L through FIG. 3O are images of a non-colored and colored synthetic teeth brace, with teeth and without teeth, according to certain embodiments.
Figure 3N:
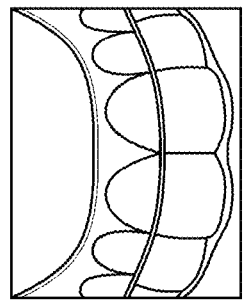
Figure 3M:
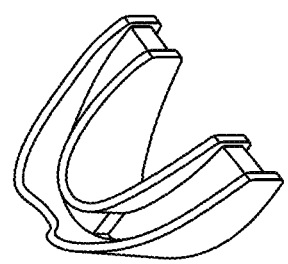
Figure 3L:
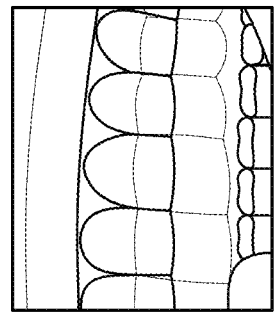

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

As used herein, the term "curing" refers to a chemical process employed in polymer chemistry and process engineering that produces the toughening or hardening of a polymer material by cross-linking of polymer chains. Curing can be induced by various stimuli such as heat, light, radiation, electron beams, or chemical additives.

As used herein, the term 'organic' refers to a substance or material that can be produced from naturally occurring substances or materials.

As used herein, the term 'organic dental device' refers to a dental appliance or material made from natural, biodegradable, and environmentally friendly substances, as opposed to synthetic or petrochemical-based materials. These devices are typically composed of organic compounds such as plant-derived polymers, natural fibres, or biopolymers, and may incorporate elements like starch, cellulose, or organic minerals.

As used herein, "particle size" may be considered the lengths or longest dimensions of a particle, respectively.

As used herein, the term "polymer" refers to a large molecule comprising a chain of smaller repeating units called monomers.

As used herein, the term 'plasticizer' refers to substances added to a polymeric solution to incorporate plasticity and flexibility into the polymer.

As used herein, the term 'preparation' or 'matrix' refers to a mixture combining two or more substances or a material in which other components are dissolved or dispersed.

As used herein, the term 'tensile strength' refers to the maximum amount of a tensile (e.g., pulling or stretching) force a material can withstand before breaking or failing. Tensile strength is typically measured in units of force per cross-sectional area, such as pounds per square inch (psi) or megapascals (MPa).

As used herein, the term 'tensile modulus', also known as the modulus of elasticity in tension, is a measure of a material's stiffness or resistance to deformation under a tensile (e.g., stretching) stress. A higher tensile modulus means the material is stiffer and will deform less under stress. It is typically expressed in units of pressure, such as pascals (Pa), megapascals (MPa), or gigapascals (GPa).

As used herein, the term 'antioxidant' refers to a substance that helps protect cells and tissues from damage caused by free radicals, which are unstable molecules that can cause oxidative stress. Antioxidants work by neutralizing free radicals, thus preventing or reducing potential damage. Common antioxidants include vitamins C, vitamin E, beta-carotene, and polyphenols.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100 wt. %.

Aspects of the present disclosure are directed toward an organic dental device comprising a biobased preparation for use in dental fitting or surgical applications. In some embodiments, the biobased preparation comprises naturally occurring, renewable sources and may be of plant or animal origin. In certain embodiments, the biobased matrix is obtained from a plant-based source. In one embodiment, the biobased preparation is obtained from an animal source. In another embodiment, the biobased preparation is obtained from plant and animal sources.

In one embodiment, the organic dental device comprises a biobased matrix comprising a nanocomposite. The nanocomposite comprises a mixture of nanostarch and nanocellulose obtained from olive seed, date seed, fish bone, and sheep bone. Fish bone and sheep bone may serve as useful components of the organic dental device due to their inclusion of hydroxyapatite. Hydroxyapatite may be important in dental devices because it may aid in the integration of the dental device with the surrounding bone, leading to faster healing and a stronger bond in a mouth of a subject. Hydroxyapatite may, therefore, aid in increasing the success rate of a dental device by facilitating osseointegration (i.e., bone growth around the device) due to its similar composition to natural bone mineral. Moreover, because hydroxyapatite is naturally found in teeth and bones, it is well-tolerated by the body, minimizing the risk of adverse effects when a dental device is placed. Olive seed and date seed may serve as useful components of the organic dental device due to their inclusion of dietary fiber, phenols, and fatty acids. In dental devices, the inclusion of fiber may aid in enhancing the strength, durability, and flexibility of dental devices, allowing them to better withstand forces and resist fracture, especially when used in applications like crowns, bridges, and braces. The inclusion of fiber may also allow the dental device to bend slightly under pressure without breaking. Further, fiber is considered biocompatible, meaning it is well-tolerated by the body, thus limiting potential adverse reactions. Olive seeds and date seeds may also contain phenols, including hydroxytyrosol, tyrosol, nüzhenide, and oleuropein. Phenols may be beneficial in dental devices due to their potent antimicrobial, antioxidant, and anti-inflammatory properties, which can help prevent dental caries, reduce plaque formation, and inhibit the growth of harmful bacteria. Phenols may act as antimicrobials by inhibiting the growth of bacteria associated with dental caries, like *Streptococcus mutans*, by disrupting their cell membranes and inhibiting their metabolic processes. Phenols may also interfere with the formation of bacterial biofilms, preventing bacteria from adhering to tooth surfaces and forming plaque. Phenols may also act as antioxidants by neutralizing harmful free radicals in the oral cavity which may contribute to bleeding gums and swelling. Olive seeds and date seeds may comprise fatty acids such as oleic, linoleic, palmitic, and α-linolenic acid. Fatty acids may be beneficial in dental devices due to their anti-inflammatory properties, which can help reduce gum inflammation thus supporting healthy gum tissue and bone structure around the teeth.

In one embodiment, the nanocomposite comprises 15 to 35 wt. % date seed nanocellulose and nanostarch relative to a total weight of the nanocomposite. In another embodiment, the nanocomposite comprises 16 to 34 wt. % date seed nanocellulose and nanostarch relative to a total weight of the nanocomposite, preferably 17 to 33 wt. %, preferably 18 to 32 wt. %, preferably 19 to 31 wt. %, preferably 20 to 30 wt. %, preferably 21 to 29 wt. %, preferably 22 to 28 wt. %, preferably 23 to 27 wt. %, preferably 24 to 26 wt. %, most preferably 25 wt. % date seed nanocellulose and nanostarch relative to a total weight of the nanocomposite. In one embodiment, the nanocomposite comprises 10 to 30 wt. % olive seed nanocellulose and nanostarch relative to a total weight of the nanocomposite. In another embodiment, the nanocomposite comprises 11 to 29 wt. % olive seed nanocellulose and nanostarch relative to a total weight of the nanocomposite, preferably 12 to 28 wt. %, preferably 13 to 27 wt. %, preferably 14 to 26 wt. %, preferably 15 to 25 wt. %, preferably 16 to 24 wt. %, preferably 17 to 23 wt. %, preferably 18 to 22 wt. %, preferably 19 to 21 wt. %, most preferably 20 wt. % olive seed nanocellulose and nanostarch relative to a total weight of the nanocomposite. In one embodiment, the nanocomposite comprises 1 to 10 wt. % fish bone nanocellulose and nanostarch relative to a total weight of the nanocomposite. In another embodiment, the nanocomposite comprises 1.5 to 9.5 wt. % fish bone nanocellulose and nanostarch relative to a total weight of the nanocomposite, preferably 2 to 9 wt. %, preferably 2.5 to 8.5 wt. %, preferably 2.5 to 8 wt. %, preferably 2.5 to 7.5 wt. %, preferably 2.5 to 7 wt. %, preferably 2.5 to 6.5 wt. %, preferably 2.5 to 6 wt. %, preferably 2.5 to 5.5 wt. %, preferably 2.5 to 5 wt. %, preferably 2.5 to 4.5 wt. %, preferably 2.5 to 4 wt. %, preferably 2.5 to 3.5 wt. %, preferably 2.5 to 3 wt. %, most preferably 2.5 wt. % fish bone nanocellulose and nanostarch relative to a total weight of the nanocomposite. Suitable examples of fish bone powder include, but are not limited to, blida fish bone meal, tuna fish bone meal, tilapia bone meal, milkfish bone meal, panga bone powder, grass carp bone powder, seabream bone powder, salmon bone powder, and silver carp bone powder. In one embodiment, the nanocomposite comprises 1 to 10 wt. % sheep bone nanocellulose and nanostarch relative to a total weight of the nanocomposite. In another embodiment, the nanocomposite comprises 1.5 to 9.5 wt. % sheep bone nanocellulose and nanostarch relative to a total weight of the nanocomposite, preferably 2 to 9 wt. %, preferably 2.5 to 8.5 wt. %, preferably 2.5 to 8 wt. %, preferably 2.5 to 7.5 wt. %, preferably 2.5 to 7 wt. %, preferably 2.5 to 6.5 wt. %, preferably 2.5 to 6 wt. %, preferably 2.5 to 5.5 wt. %, preferably 2.5 to 5 wt. %, preferably 2.5 to 4.5 wt. %, preferably 2.5 to 4 wt. %, preferably 2.5 to 3.5 wt. %, preferably 2.5 to 3 wt. %, most preferably 2.5 wt. % sheep bone nanocellulose and nanostarch relative to a total weight of the nanocomposite. Suitable examples of sheep bone powder include, but are not limited to, sheep bone ash, sheep bone black, and sheep bone meal.

In an embodiment, the biobased preparation (matrix) comprises a mixture of olive seed nanocellulose, date seed nanocellulose, fish bone nanocellulose, sheep bone nanocellulose, olive seed nanostarch, date seed nanostarch, fish bone nanostarch, and sheep bone nanostarch. In one embodiment, the mixture comprises 40 to 60 wt. % of nanostarch relative to a total weight of the mixture. In another embodiment, the mixture comprises 41 to 59 wt. % of nanostarch relative to a total weight of the mixture, preferably 42 to 58 wt. %, preferably 43 to 57 wt. %, preferably 44 to 56 wt. %, preferably 45 to 55 wt. %, preferably 46 to 54 wt. %, preferably 47 to 53 wt. %, preferably 48 to 52 wt. %, preferably 49 to 51 wt. %, preferably 49 to 50 wt. %, most preferably 49.2 wt. % of nanostarch relative to a total weight of the mixture. In an embodiment, the nanostarch has an average particle size of 18 nm or less, preferably 17.5 nm or less, preferably 17 nm or less, preferably 16.5 nm or less, preferably 16 nm or less, preferably 15.5 nm or less, preferably 15 nm or less, preferably 14.5 nm or less, most preferably 14 nm or less. In one embodiment, the mixture comprises 50 to 65 wt. % of the nanocellulose relative to a total weight of the mixture. In another embodiment, the mixture comprises 51 to 64 wt. % of nanocellulose relative to a total weight of the mixture, preferably 51 to 63 wt. %, preferably 51 to 62 wt. %, preferably 51 to 61 wt. %, preferably 51 to 60 wt. %, preferably 51 to 59 wt. %, preferably 51 to 58 wt. %, preferably 51 to 57 wt. %, preferably 51 to 56 wt. %, preferably 51 to 55 wt. %, preferably 51 to 54 wt. %, preferably 51 to 53 wt. %, preferably 51 to 52 wt. %, most preferably 51.2 wt. % of nanocellulose relative to a total weight of the mixture. In one embodiment, nanocellulose has an average particle size of 21 nm or less, preferably 20.5 nm or less, preferably 20 nm or less, preferably 19.5 nm or less, preferably 19 nm or less, preferably 18.5 nm or less, preferably 18 nm or less, preferably 17.5 nm or less, most preferably 17 nm or less. In one embodiment, the biobased matrix comprises nanoparticles having an average particle size of 20 nm or less, preferably 19.5 nm or less, preferably 19 nm or less, preferably 18.5 nm or less, preferably 18 nm or less, preferably 17.5 nm or less, preferably 17 nm or less, preferably 16.5 nm or less, preferably 16 nm or less, most preferably 15.5 nm or less.

In one embodiment, the organic dental device comprises a biobased matrix comprising an organic composition including a pigment mixture. In an embodiment, the organic composition comprises at least one selected from the group consisting of starch, a moringa leaf extract, fish bone powder, sheep bone powder, and a chicken-sourced glycerin. In some embodiments, the organic composition comprises starch. In some embodiments, the starch may be obtained from corn, cassava, rice, bananas, arrowroot, barley, corn, potatoes, tapioca, wheat, and the like. In some embodiments, the organic composition comprises 1 to 15 wt. % starch relative to a total weight of the organic composition, preferably 2 to 14 wt. %, preferably 3 to 13 wt. %, preferably 4 to 12 wt. %, preferably 5 to 11 wt. %, preferably 5 to 10 wt. %, preferably 5 to 9 wt. %, preferably 5 to 8 wt. %, preferably 5 to 7 wt. %, preferably 5 to 6 wt. %, most preferably 5 wt. % starch relative to a total weight of the organic composition. In some embodiments, the organic composition comprises moringa leaf extract. Moringa leaf extract may comprise β-carotene and vitamin E, providing the extract with antioxidant properties. Antioxidants may benefit dental devices by helping to protect the soft tissues in the mouth from irritation and inflammation, potentially leading to a more comfortable wearing experience, especially during orthodontic treatment, as they can neutralize free radicals that could damage gum tissue and promote healing around the retainer's contact points with the gums. In one embodiment, the organic composition comprises 1 to 15 wt. % of moringa leaf extract relative to a total weight of the organic composition, preferably 2 to 14 wt. %, preferably 2 to 13 wt. %, preferably 2 to 12 wt. %, preferably 2 to 11 wt. %, preferably 2 to 10 wt. %, preferably 2 to 9 wt. %, preferably 2 to 8 wt. %, preferably 2 to 7 wt. %, preferably 2 to 6 wt. %, preferably 2 to 5 wt. %, preferably 2 to 4 wt. %, preferably 2 to 3 wt. %, most preferably 2 wt. % moringa leaf extract relative to a total weight of the organic composition. In some embodiments, the organic composition comprises chicken-sourced glycerin. Glycerin is highly soluble in water and enhances the strength of a dental device by interrupting the oxygen interfering with a surface of the molded structure when curing occurs, thus eliminating creating of an uncured layer on the surface of the molded structure. In some embodiments, the organic composition comprises chicken-sourced glycerin in an amount of 1 to 15 wt. % relative to a total weight of the organic composition, preferably 2 to 14 wt. %, preferably 3 to 13 wt. %, preferably 3 to 12 wt. %, preferably 3 to 11 wt. %, preferably 3 to 10 wt. %, preferably 3 to 9 wt. %, preferably 3 to 8 wt. %, preferably 3 to 7 wt. %, preferably 3 to 6 wt. %, preferably 3 to 5 wt. %, preferably 3 to 4 wt. %, most preferably 3 wt. % relative to a total weight of the organic composition. In a preferred embodiment, the organic composition comprises beetroot peel pigment, starch, moringa leaf extract, waste blueberry pigment, ajwa date coating, and chicken-sourced glycerin.

In one embodiment, the organic dental device comprises a biobased matrix comprising a pigment composition. In an embodiment, the pigment composition comprises at least one selected from the group consisting of beetroot peel pigment, waste blueberry pigment, and an ajwa date coating. In some embodiments, the pigment composition comprises a beetroot peel pigment. When extracted from beetroot peels, the resulting organic dye is a red, pink, or fuchsia color. In some embodiments, the beetroot peel dye is obtained by grinding beetroot peels into a fine powder. In one embodiment, the fine powder obtained from the beetroot peels has an average particle size of 100 to 200 μm, preferably 110 to 190 μm, preferably 120 to 180 μm, preferably 130 to 170 μm, preferably 140 to 160 μm, most preferably 150 μm. Once the fine powder of the beetroot peels is obtained, the pigment is extracted from the fine powder by simmering the powder in a solvent, the length of simmering depending on the dye shade desired. In one embodiment, the fine powder is boiled in the solvent for 1 to 24 h, preferably 2 to 22 h, preferably 2 to 20 h, preferably 2 to 18 h, preferably 2 to 16 h, preferably 2 to 14 h, preferably 2 to 12 h, preferably 2 to 10 h, preferably 2 to 8 h, preferably 2 to 6 h, preferably 2 to 4 h, most preferably 2 h. Any suitable solvent may be used such as water, ethanol, acetone, methanol, acetonitrile, dimethyl sulfoxide (DMSO), chloroform, n-hexane, ethyl acetate, toluene, dichloromethane (DCM), isopropanol, or any other suitable extraction solvent. In one embodiment, the extraction solvent is water. In an embodiment, the pigment composition comprises the beetroot peel pigment in an amount of 1 to 15 wt. % relative to a total weight of the pigment composition, preferably 2 to 14 wt. %, preferably 3 to 13 wt. %, preferably 4 to 12 wt. %, preferably 5 to 11 wt. %, preferably 5 to 10 wt. %, preferably 5 to 9 wt. %, preferably 5 to 8 wt. %, preferably 5 to 7 wt. %, preferably 5 to 6 wt. %, most preferably 5 wt. % relative to a total weight of the pigment composition. In some embodiments, the pigment composition comprises waste blueberry pigment. Waste blueberry pigment may comprise phenols such as catechin, epicatechin, chlorogenic acid, and malvidin. Phenols may be beneficial in dental devices due to their potent antimicrobial, antioxidant, and anti-inflammatory properties, which can help prevent dental caries, reduce plaque formation, and inhibit the growth of harmful bacteria. Phenols may act as antimicrobials by inhibiting the growth of bacteria associated with dental caries, like *Streptococcus mutans*, by disrupting their cell membranes and inhibiting their metabolic processes. Phenols may also interfere with the formation of bacterial biofilms, preventing bacteria from adhering to tooth surfaces and forming plaque. Phenols may also act as antioxidants by neutralizing harmful free radicals in the oral cavity which may contribute to bleeding gums and swelling. In one embodiment, the pigment composition comprises 1 to 15 wt. % of waste blueberry extract relative to a total weight of the pigment composition, preferably 2 to 14 wt. %, preferably 3 to 13 wt. %, preferably 4 to 12 wt. %, preferably 4 to 11 wt. %, preferably 4 to 10 wt. %, preferably 4 to 9 wt. %, preferably 4 to 8 wt. %, preferably 4 to 7 wt. %, preferably 4 to 6 wt. %, preferably 4 to 5 wt. %, most preferably 4 wt. % waste blueberry pigment relative to a total weight of the pigment composition. In some embodiments, the pigment composition comprises ajwa date coating. Ajwa date coating may comprise increased levels of potassium, which may aid in protecting teeth from acid and reducing teeth sensitivity. In one embodiment, the pigment composition comprises 1 to 15 wt. % of ajwa date coating relative to a total weight of the pigment composition, preferably 2 to 14 wt. %, preferably 3 to 13 wt. %, preferably 4 to 12 wt. %, preferably 5 to 11 wt. %, preferably 5 to 10 wt. %, preferably 5 to 9 wt. %, preferably 5 to 8 wt. %, preferably 5 to 7 wt. %, preferably 5 to 6 wt. %, most preferably 5 wt. % ajwa date coating relative to a total weight of the pigment composition.

In some embodiments, the pigment composition has an amount of carotine of 2 to 4 mg/L, preferably 2.2 to 3.8 mg/L, preferably 2.4 to 3.6 mg/L, preferably 2.6 to 3.4 mg/L, preferably 2.6 to 3.2 mg/L, preferably 2.6 to 3.0 mg/L, preferably 2.6 to 2.8 mg/L, most preferably 2.7±0.03 mg/L. In some embodiments, the pigment composition has an amount of anthocyanin of 3 to 6 mg/L, preferably 3.2 to 5.8 mg/L, preferably 3.4 to 5.6 mg/L, preferably 3.6 to 5.4 mg/L, preferably 3.8 to 5.2 mg/L, preferably 4.0 to 5.0 mg/L, preferably 4.2 to 5.0 mg/L, preferably 4.4 to 5.0 mg/L, preferably 4.6 to 5.0 mg/L, preferably 4.8 to 5.0 mg/L, most preferably 4.8±0.02 mg/L.

In an embodiment, the organic dental device comprises a biobased matrix comprising an adhesive component. In some embodiments, the adhesive component comprises at least one of a cyanoacrylate adhesive, *Acacia arabica* glue, a *Lannea* sp fresh gum, okra gel, aloe vera gel, and jackfruit latex. In some embodiments, the adhesive component comprises waste jackfruit latex from jackfruit trees (*Artocarpus heterophyllus*). Jackfruit trees can be found in tropical areas including Thailand. Waste jackfruit latex is a sticky, white, milky latex that is excreted by jackfruit trees. Waste jackfruit latex is in the form of an aqueous emulsion and comprises many ingredients including, but not limited to, lipids, rubbers, and resins. Waste jackfruit latex can be used as an adhesive or as a natural replacement for synthetic resins, aiding in the production of a molded structure having increased mechanical strength to form the disclosed dental device. In some embodiments, the adhesive component comprises waste jackfruit latex in an amount of 1 to 6 wt. % relative to a total weight of the adhesive component, preferably 2 to 5 wt. %, preferably 3 to 4 wt. %, most preferably about 4 wt. % relative to a total weight of the adhesive component. In some embodiments, the adhesive component comprises a natural glue. In some embodiments, the natural glue is a *Lannea* sp. glue. Trees of the *Lannea* genus are found in tropical areas and produce a sap that is sticky due to the presence of sugars produced by photosynthesis, similar to other tree saps. *Lannea* sp glue may aid in creating a dental device having increased mechanical strength and curing properties, while also providing an organic alternative to synthetic adhesives and resins that are often utilized in other dental devices. In one embodiment, the adhesive component comprises a *Lannea* sp. glue in an amount of 1 to 6 wt. % relative to a total weight of the adhesive component, preferably 2 to 5 wt. %, preferably 2 to 4 wt. %, preferably 2 to 3 wt. %, most preferably 2 wt. % relative to a total weight of the adhesive component. In some embodiments, the adhesive component comprises *Acacia arabica* gel. *Acacia arabica* gel, also known as gum arabic gel, is a natural substance derived from the *Acacia arabica* tree. *Acacia arabica* gel may aid in creating a dental device having increased mechanical strength, while providing an organic alternative to synthetic adhesives often utilized in other dental devices. *Acacia arabica* gel may also provide anti-plaque and anti-gingivitis benefits to the dental device by helping to reduce inflammation and plaque buildup on the dental device and teeth of the user. In some embodiments, the adhesive component comprises *Acacia arabica* gel in an amount of 1 to 6 wt. % relative to the total weight of the adhesive component, preferably 2 to 5 wt. %, preferably 2 to 4 wt. %, preferably 2 to 3 wt. %, most preferably 2 wt. % relative to a total weight of the adhesive component. In some embodiments, the adhesive component comprises a cyanoacrylate adhesive. Suitable cyanoacrylate adhesives include, but are not limited to, methyl 2-cyanoacrylate (MCA), ethyl 2-cyanoacrylate (ECA), n-butyl cyanoacrylate (n-BCA), octyl cyanoacrylate, and 2-octyl cyanoacrylate. In one embodiment, the cyanoacrylate adhesive is present in an amount of 1 to 6 wt. % relative to a total weight of the adhesive component, preferably 2 to 5 wt. %, preferably 3 to 4 wt. %, most preferably 3 wt. % relative to a total weight of the adhesive component. In some embodiments, the adhesive component comprises okra gel. In some embodiments, the adhesive component comprises aloe vera gel. Both aloe vera gel and okra gel may aid in creating a dental device having increased mechanical strength, while also providing organic and biodegradable alternatives to synthetic adhesives often utilized in other dental devices. In an embodiment, the adhesive component comprises 1 to 6 wt. % okra gel relative to a total weight of the adhesive component, preferably 2 to 5 wt. %, preferably 2 to 4 wt. %, preferably 2 to 3 wt. %, most preferably 2 wt. % okra gel relative to a total weight of the adhesive component. In an embodiment, the adhesive component comprises 1 to 6 wt. % aloe vera gel relative to a total weight of the adhesive component, preferably 2 to 5 wt. %, preferably 2 to 4 wt. %, preferably 2 to 3 wt. %, most preferably 2 wt. % aloe vera gel relative to a total weight of the adhesive component.

The organic dental device comprises a biobased matrix comprising ZnO nanoparticles. ZnO nanoparticles have antimicrobial properties against a wide range of bacteria, fungi, and viruses. Further, ZnO nanoparticles have anti-inflammatory properties which may aid user comfort by reducing gum swelling and bleeding when the dental device is in use. ZnO nanoparticles may also help reduce oxidative stress, increase tissue granulation, and stimulate cell migration at the wound site. The ZnO nanoparticles may exists in variety of morphological shapes, such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, etc., and mixtures thereof. In a preferred embodiment, the ZnO nanoparticles are spherical. In an embodiment, the ZnO nanoparticles have an average particle size of 30 nm or less, preferably 29 nm or less, preferably 28 nm or less, preferably 27 nm or less, preferably 26 nm or less, preferably 25 nm or less, preferably 24 nm or less, preferably 23 nm or less, preferably 22 nm or less, preferably 21 nm or less, most preferably 20 nm or less. In an embodiment, the biobased matrix comprises ZnO nanoparticles in an amount of 1 to 10 wt. % relative to a total weight of the biobased matrix, preferably 1.5 to 9.5 wt. %, preferably 2 to 9 wt. %, preferably 2.5 to 8.5 wt. %, preferably 2.5 to 8 wt. %, preferably 2.5 to 7.5 wt. %, preferably 2.5 to 7 wt. %, preferably 2.5 to 6.5 wt. %, preferably 2.5 to 6 wt. %, preferably 2.5 to 5.5 wt. %, preferably 2.5 to 5 wt. %, preferably 2.5 to 4.5 wt. %, preferably 2.5 to 4 wt. %, preferably 2.5 to 3.5 wt. %, preferably 2.5 to 3 wt. %, most preferably 3 wt. % relative to the total weight of the biobased matrix.

In one embodiment, the organic dental device comprises a biobased matrix comprising a plasticizer mixture comprising a polyvinyl chloride. The plasticizer mixture may further comprise another plasticizer including, but are not limited to, dioctyl phthalate, di-n-butyl phthalate, diethyl phthalate, butyl benzyl phthalate, trimellitate, citrates, acetyl tributyl citrate, epoxidized linseed oil, epoxidized palm oil, polyethylene glycol, glycerol triacetate, tri-n-butyl phosphate, di-n-octyl adipate, isodecyl alcohol, oleic acid esters, di(2-ethylhexyl) adipate, castor oil derivatives, dodecyl benzenesulfonic acid, stearic acid derivatives, chlorinated paraffins, isobutyl alcohol esters, tricresyl phosphate, sucrose acetate isobutyrate, octylphenol ethoxylates, polyvinyl alcohol, cyclohexane-1,2-dicarboxylic acid diisononyl ester, trimethylolpropane triheptanoate, diethylhexyl adipate, acetyl tributyl citrate, and propylene glycol diacetate. Plasticizers may be used in dental devices to improve the flexibility, softness, and break resistance of the device, resulting in a dental device having increased durability. In an embodiment, the plasticizer further comprises at least one selected from the group consisting of diisononyl phthalate (DINP), diisodecyl phthalate (DIDP), di(2-ethylhexyl) phthalate (DEHP), polypropylene glycol dibenzoate (PGDB), and epoxidized soybean oil (ESBO). In a preferred embodiment, the plasticizer mixture comprises polyvinyl chloride. In one embodiment, the biobased matrix comprises a plasticizer mixture in an amount of about 5 to 15 wt. % relative to a total weight of the biobased matrix, preferably 6 to 14 wt. %, preferably 7 to 13 wt. %, preferably 8 to 12 wt. %, preferably 8 to 11 wt. %, preferably 8 to 10 wt. %, preferably 8 to 9 wt. %, most preferably 8 wt. % relative to a total weight of the biobased preparation.

In an embodiment, the organic dental device has a molded structure in the form of a dental arch having a plurality of impressions and/or pockets to conform to teeth of a subject. These impressions and pockets are designed to fit the natural alignment and contour of a user's teeth, ensuring a customized and functional fit. The structure of the dental arch is created through a molding process that accurately replicates the anatomical features of the teeth and surrounding gum areas, providing a secure and comfortable fit for the subject's wear.

In an embodiment, the dental device has a tensile strength of 85 MPa/kg·m$^3$ or more, preferably 86 MPa/kg·m$^3$ or more, preferably 87 MPa/kg·m$^3$ or more, preferably 88 MPa/kg·m$^3$ or more, preferably 89 MPa/kg·m$^3$ or more, preferably 90 MPa/kg·m$^3$ or more, preferably 91 MPa/kg·m$^3$ or more, preferably 92 MPa/kg·m$^3$ or more, preferably 93 MPa/kg·m$^3$ or more, preferably 94 MPa/kg·m$^3$ or more, most preferably 95 MPa/kg·m$^3$. In an embodiment, the dental device has a tensile modulus of 1.5 GPa or more, preferably 1.51 GPa or more, preferably 1.52 GPa or more, preferably 1.53 GPa or more, preferably 1.54 GPa or more, preferably 1.55 GPa or more, preferably 1.56 GPa or more, preferably 1.57 GPa or more, preferably 1.58 GPa or more, preferably 1.59 GPa or more, preferably 1.60 GPa or more, preferably 1.61 GPa or more, preferably 1.62 GPa or more, preferably 1.63 GPa or more, preferably 1.64 GPa or more, most preferably 1.65 GPa or more.

Referring to FIG. 1, a method 50 of making the dental device is described. The order in which the method 50 is described is not intended to be construed as a limitation, and any number of the described method 50 steps may be combined in any order to implement the method 50. Additionally, individual steps may be removed or skipped from method 50 without departing from the spirit and scope of the present disclosure.

At step 52, the method 50 comprises drying the olive seed, date seed, fish bone, and sheep bone at a temperature of 125 to 145° C. for 1 to 4 h to obtain a mixture comprising nanocellulose and nanostarch of olive seed, date seed, fish bone, and sheep bone. In one embodiment, the method comprises drying the olive seed, date seed, fish bone, and sheep bone at a temperature of 125 to 145° C., preferably 126 to 144° C., preferably 127 to 143° C., preferably 128 to 142° C., preferably 129 to 141° C., preferably 130 to 140° C., preferably 131 to 139° C., preferably 132 to 138° C., preferably 133 to 137° C., preferably 134 to 137° C., preferably 135 to 137° C., preferably 136 to 137° C., most preferably 137° C. In one embodiment, the method comprises drying the olive seed, date seed, fish bone, and sheep bone for 1 to 4 h, preferably 1.5 to 3.5 h, preferably 2 to 3 h, preferably 2 to 2.5 h, most preferably 2.5 h to obtain a mixture comprising nanocellulose and nanostarch of olive seed, date seed, fish bone, and sheep bone. In some embodiments, the drying may be performed by using heating appliances such as ovens, microwaves, autoclaves, hot plates, heating mantles and tapes, oil baths, salt baths, sand baths, air baths, hot-tube furnaces, and hot-air guns. In a preferred embodiment, the heating appliance is oven. In one embodiment, after drying, the mixture comprising nanocellulose and nanostarch of olive seed, date seed, fish bone, and sheep bone is ground to obtain a powder having an average particle size of 50 nm or less, preferably 49 nm or less, preferably 48 nm or less, preferably 47 nm or less, preferably 46 nm or less, preferably 45 nm or less, preferably 44 nm or less, preferably 43 nm or less, preferably 42 nm or less, preferably 41 nm or less, preferably 40 nm or less, preferably 39 nm or less, preferably 38 nm or less, preferably 37 nm or less, preferably 36 nm or less, preferably 35 nm or less, preferably 34 nm or less, preferably 33 nm or less, preferably 32 nm or less, preferably 31 nm or less, most preferably 30 nm or less.

At step 54, the method 50 comprises hydrolyzing a mixture of olive seed, date seed, fish bone, and sheep bone with at least one inorganic acid to obtain the nanocomposite. Suitable inorganic acid may include, but are not limited to, sulfuric acid ($H_2SO_4$), nitric acid ($HNO_3$), phosphoric acid ($H_3PO_4$), hydrofluoric acid (HF), trifluoroacetic acid, perchloric acid ($HClO_4$), hydrobromic acid (HBr), hydroiodic acid (HI), chromic acid ($H_2CrO_4$), boric acid ($H_3BO_3$), periodic acid ($HIO_4$), selenic acid ($H_2SeO_4$), telluric acid ($H_6TeO_6$), sulfurous acid ($H_2SO_3$), nitrous acid ($HNO_2$), hypochlorous acid (HClO), chloric acid ($HClO_3$), iodic acid ($HIO_3$), bromic acid ($HBrO_3$), fluorosilicic acid ($H_2SiF_6$), carbonic acid ($H_2CO_3$), arsenic acid ($H_3AsO_4$), antimonic acid ($HSbO_3$), tungstic acid ($H_2WO_4$), vanadic acid ($H_3VO_4$), manganic acid ($H_2MnO_4$), pyrophosphoric acid ($H_4P_2O_7$), metaphosphoric acid ($HPO_3$), formic acid (HCOOH), and acetic acid ($CH_3COOH$). In one embodiment, the inorganic acid is at least one selected from the group consisting of hydrochloric acid, nitric acid, hydrobromic acid, sulfuric acid, hydrofluoric acid, and phosphoric acid. In a preferred embodiment, the inorganic acid is at least one selected from the group consisting of HCl and $H_2SO_4$. In some embodiments, the inorganic acid is HCl. In one embodiment, the HCl has a concentration of 80 to 90%. In some embodiments, the concentration of HCl is 81%, 82%, 83%, 84%, 85%, 86%, 87%, 88%, 89%, or 90%. In a preferred embodiment, the concentration of HCl is 88%. In some embodiments, the inorganic acid is sulfuric acid. In one embodiment, the sulfuric acid has a concentration of 90 to 95%. In some embodiments, the concentration of sulfuric acid is 91%, 92%, 93%, 94%, or 95%. In a preferred embodiment, the concentration of sulfuric acid is 92%. In an embodiment, each component of the mixture is hydrolyzed individually to obtain their respective nanoparticles.

At step 56, the method 50 comprises preparing ZnO nanoparticles, then combining the nanocomposite with the organic composition, the pigment composition, the ZnO nanoparticles, the adhesive component, and the plasticizer mixture to form the biobased matrix. The ZnO nanoparticles are prepared by reacting a zinc precursor with an organic solvent to obtain a reaction mixture. In one embodiment, the zinc precursor may be selected from a zinc citrate, a zinc iodide, zinc perchlorate, zinc phosphate, zinc triflate, zinc bis(trifluoromethanesulfonyl)imide, zinc tetrafluoroborate, zinc bromide, a hydrate thereof, or mixtures thereof. In alternate embodiments, the zinc precursor is selected from a zinc nitrate hydrate, a zinc chloride hydrate, a zinc sulfate hydrate, and a zinc acetate hydrate. Preferably, the zinc precursor is in a nitrate form because the nitrate form has greater water solubility, thereby achieving greater homogenization during synthesis of the reaction mixture. In a preferred embodiment, the zinc precursor is zinc nitrate hexahydrate ($Zn(NO_3)_2:6H_2O$). In some embodiments, the zinc precursor is mixed with the organic solvent to obtain the reaction mixture. Suitable examples of organic solvents include ethanol, methanol, and other polar organic solvents. In an embodiment, the organic solvent is at least one selected from the group consisting of ethanol, methanol, and propanol. The reaction mixture is then heated to a temperature of at least 100° C. to obtain a final suspension. In some embodiments, the reaction mixture is heated to a temperature of 101° C., preferably 102° C., preferably 103° C., preferably 104° C., preferably 105° C., preferably 106° C., preferably 107° C., preferably 108° C., preferably 109° C., preferably 110° C., preferably 111° C., preferably 112° C., preferably 113° C., preferably 114° C., preferably 115° C., preferably 116° C., preferably 117° C., preferably 118° C., preferably 119° C., most preferably 120° C. In a preferred embodiment, the reaction mixture is heated to a temperature of 120° C. to obtain a final suspension. The heating can be done by using heating appliances such as hot plates, muffle furnace, tube furnace, heating mantles ovens, microwaves, autoclaves, tapes, oil baths, salt baths, sand baths, air baths, hot-tube furnaces, hot-air guns, and other methods known in the art. In some embodiments, the final suspension is then centrifuged to separate the ZnO nanoparticles from the reaction medium and unreacted precursors. In an embodiment, the final suspension is centrifuged at 1,000 to 8,000 rpm for 1 to 30 min to obtain the ZnO nanoparticles. In one embodiment, the final suspension is centrifuged at 1,500 to 7,500 rpm, preferably 2,000 to 7,000 rpm, preferably 2,500 to 6,500 rpm, preferably 3,000 to 6,000 rpm, preferably 3,000 to 5,500 rpm, preferably 3,000 to 5,000 rpm, preferably 3,000 to 4,500 rpm, preferably 3,000 to 4,000 rpm, preferably 3,000 to 3,500 rpm, most preferably 3,000 rpm. In another embodiment, the final suspension is centrifuged for 2 to 30 min, preferably 3 to 30 min, preferably 4 to 30 min, preferably 5 to 30 min, preferably 6 to 30 min, preferably 7 to 30 min, preferably 8 to 30 min, preferably 9 to 30 min, preferably 10 to 30 min, preferably 11 to 30 min, preferably 12 to 30 min, preferably 13 to 30 min, preferably 14 to 30 min, preferably 15 to 30 min, preferably 16 to 30 min, preferably 17 to 30 min, preferably 18 to 30 min, preferably 19 to 30 min, preferably 20 to 30 min, preferably 21 to 30 min, preferably 22 to 30 min, preferably 23 to 30 min, preferably 24 to 30 min, preferably 25 to 30 min, preferably 26 to 30 min, preferably 27 to 30 min, preferably 28 to 30 min, preferably 29 to 30 min, most preferably 30 min. In a preferred embodiment, the final suspension is centrifuged at 3,000 rpm for 30 min. In some embodiments, the ZnO nanoparticles have an average particle size of 20 nm or less, preferably 19 nm, preferably 18 nm, preferably 17 nm, preferably 16 nm, preferably 15 nm.

At step 58, the method 50 comprises pressing the biobased matrix into a mold and curing to form the dental device. In some embodiments, the processes used for pressing the biobased matrix into the mold may include mixing, heating, shaping, compressing, cooling, and demolding. In some embodiments, the curing is photocuring or thermal curing. Thermal curing is the process of temperature-induced chemical change in a material, such as the polymerization of a thermoset resin. Photocuring, also known as photopolymerization, is a process that hardens a substance by exposing it to a specific wavelength of light. The process involves irradiating specially formulated compositions, usually liquid and solventless, with ultraviolet or visible light to rapidly convert them into solid films. In an embodiment, the mold is cured by photocuring with a light curing device for 10 to 30 seconds(s) at a light intensity of 250 to 850 $mW/cm^2$. In one embodiment, the mold is cured with a light curing device for 11 to 29 s, preferably 12 to 28 s, preferably 13 to 27 s, preferably 14 to 26 s, preferably 15 to 25 s, preferably 16 to 24 s, preferably 17 to 23 s, preferably 18 to 22 s, preferably 19 to 20 s. In one embodiment, the mold is cured at a light intensity of 250 to 850 $mW/cm^2$, preferably 260 to 840 $mW/cm^2$, preferably 270 to 830 $mW/cm^2$, preferably 280 to 820 $mW/cm^2$, preferably 290 to 810 $mW/cm^2$, preferably 300 to 800 $mW/cm^2$, preferably 310 to 790 $mW/cm^2$, preferably 320 to 780 $mW/cm^2$, preferably 330 to 770 $mW/cm^2$, preferably 340 to 760 $mW/cm^2$, preferably 350 to 750 $mW/cm^2$, preferably 360 to 740 $mW/cm^2$, preferably 370 to 730 $mW/cm^2$, preferably 380 to 720 $mW/cm^2$, preferably 390 to 710 $mW/cm^2$, preferably 400 to 700 $mW/cm^2$, preferably 400 to 690 $mW/cm^2$, preferably 400 to 680 $mW/cm^2$, preferably 400 to 670 $mW/cm^2$, preferably 400 to 660 $mW/cm^2$, preferably 400 to 650 $mW/cm^2$, preferably 400 to 640 $mW/cm^2$, preferably 400 to 630 $mW/cm^2$, preferably 400 to 620 $mW/cm^2$, preferably 400 to 610 $mW/cm^2$, preferably 400 to 600 $mW/cm^2$, preferably 400 to 590 $mW/cm^2$, preferably 400 to 580 $mW/cm^2$, preferably 400 to 570 $mW/cm^2$, preferably 400 to 560 $mW/cm^2$, preferably 400 to 550 $mW/cm^2$, preferably 400 to 540 $mW/cm^2$, preferably 400 to 530 $mW/cm^2$, preferably 400 to 520 $mW/cm^2$, preferably 400 to 510 $mW/cm^2$, most preferably 400 to 500 $mW/cm^2$. In another embodiment, the mold is cured by thermal curing at a temperature of 100 to 160° C. for 3 to 6 h. In one embodiment, the molded structure is cured at a temperature of 105 to 155° C., preferably 110 to 150° C., preferably 115 to 145° C., preferably 120 to 140° C., preferably 125 to 135° C., most preferably 130° C. FIGS. 3A through 3K show images of different organic teeth with color base dice, and FIGS. 3L through 3O show images of a non-colored and colored synthetic teeth brace, with teeth and without teeth.

EXAMPLES

The following examples illustrate an organic dental device. The examples are provided solely for illustration and are not to be construed as limitations of the present disclosure, as many variations thereof are possible without departing from the spirit and scope of the present disclosure.

Preparation

1. A mixture of nanocellulose and nanostarch from date seed, olive seed nanocellulose, fish bone, and sheep bone was dried at 137° C. in an oven for 2.5 hours.

2. The mixture of dried nanocellulose and nanostarch was subject to acid hydrolysis, using a mixture of HCl (82%) and $H_2SO_4$ (92%) to convert micro particles to nano particles.

3. A plasticizer (polyvinyl chloride, PVC (8%), ZnO nanoparticle (3%), a cyanoacrylate adhesive (3% w/v), and a starch (5%) were mixed with the nanocomposite, and a mixture of organic substances including Aloe vera gel (2%), okra gel (2%), *Acacia arabica* gel (2%), natural glue [fresh gum (*Lannea* sp)] (2%), jackfruit latex (4), and glycerin from animal (chicken toes) (3%), was mixed with the nanocomposite.

4. Nutritive substances like moringa leaf extract (2%), (contains antioxidant and minerals), fish bone powder (2.5%) as mineral sources, sheep bone powder (2.5%), as calcium sources 5. Organic pigments or dyes as an antioxidant were then added (beetroot peel pigment (5%), waste blueberry pigment (4%), and ajwa dates coating (5%), pigment or dye as anthocyanin).

Example 1: PH, Antioxidant, Cellulose, and Starch Determination

The pH, antioxidant, cellulose, and starch determination of organic dental device of the present disclosure were determined, and their values were compared to synthetic dental devices available in the market. The quantitative determination of pH, antioxidant, cellulose, and starch determination was carried out using methods known in the art. The results of this study are depicted in Table 1.

TABLE 1 pH, antioxidant, cellulose, and starch determination

| Materials | pH determination | Starch determination | Cellulose determination | Antioxidant as carotine | Antioxidant anthocyanin |
|---|---|---|---|---|---|
| Organic dental device | 7.8 ± 0.02 | 49.2% ± 0.01 | 51.2% ± 0.01 | 2.7 ± 0.03 (mg/L) | 4.8% ± 0.02 (mg/L) |
| Synthetic dental device | Alkaline ≥ 7 | It is zero if from gas or oil; if from starch sample, it is 20-60%. | It is zero if from gas or oil, if from starch sample it is 20-50%. | | |

Mean ± SE (standard Error, n = 3)

Example 2: Nanostarch and Nanocellulose Measurement

The particle size of the nanostarch and nanocellulose was measured by Scanning Electron Microscopy (SEM), and the results indicate that the average nanoparticle size of the organic dental device was 15.5 nm; in comparison, the nanoparticle size range for standard synthetic organic dental device, which typically falls between 1 and 100 nm. This illustrates that the organic dental device has a finer particle size. Fine particle size may aid in improving polishability and aesthetics of the organic dental device due to better light reflection, improved surface smoothness, higher translucency, and better ability to match natural tooth structure.

TABLE 2

Measurement of nanostarch and nanocellulose by SEM

| Materials | Nanostarch size | Nanocellulose size | Average size of the nanoparticle |
|---|---|---|---|
| Organic dental device | 14 nm | 17 nm | 15.5 nm |
| Synthetic dental device | 1-100 nm (standard) | 1-100 nm (standard) | 1-100 nm (standard) |

Example 3: Absorption Test (as ASTM D570)

The organic dental device prepared were further evaluated for the ability to absorb moisture. The tests to determine water absorption were carried out in accordance with ASTM D570. The purpose of ASTM D570 is to determine the rate of water absorption by immersing the specimen (organic dental device) in water for a specific period of time. In this test, the organic dental device absorbed 0% water. Water absorption was calculated by determining the percentage increase in weight of the sample following the experiment to characterize this attribute. The results of this study are depicted in Table 3. It can be observed that the water absorption for the organic dental device prepared by the present disclosure is very low compared to synthetic dental device, illustrating the increased water-resistance of the organic dental device.

TABLE 3

Determination of water absorption by ASTM D570.

| Materials | Water absorption | ASTM D570 Water absorption |
|---|---|---|
| Organic dental device | 0% | Water absorption by ASTM is 0-0.16%. |
| Synthetic dental device | 0-0.16% | |

Example 4: Odor Test

The organic dental device was burned using a gas burner. The odor was observed visually and compared with the synthetic dental device by ASTM D3801. The results of this study are depicted in Table 4.

TABLE 4

Odor test according to the ASTM D3801

| Materials | Odor | Color of flame | Speed of burning | Spark or not |
|---|---|---|---|---|
| Organic dental device | Low odor | Yellow-orange | Slow | Spark |
| Synthetic dental device | Low odor | Yellow-orange | Slow | Spark |

Example 5: Determination of Size and Shape Characteristics by ASTM A 500

The organic dental device was tested for fracture and shrinkage which shown no increase or decrease in its shape and size after the experiment. There was no change in its shape and size as per ASTM A500. The results of this study are depicted in Table 5.

TABLE 5

Determination of size and shape characteristics of the organic dental device

| Materials | Size and Shape | ASTM A 500 |
|---|---|---|
| Organic dental device | No swell or shrink | Resistant Characters |
| Synthetic dental device | No swell or shrink | |

Example 6: Firmness Test by Bore and Crack Test

No bore or cracks were observed as per ASTM D2925 or ASTM D5419, respectively. The results of this study are depicted in Table 6.

TABLE 6

Firmness test represented by bore and crack test.

| Materials | Bore test ASTM D2925 | Crack test by ASTM D5419 |
|---|---|---|
| Organic dental device | No bore symptom | No crack symptom |
| Synthetic dental device | No bore symptom | No Crack symptom |

Example 7: Tensile Test

The tensile test was done by a Universal Test Machine for bioplastics as ASTM D5083. Results showed the tensile strength was 95 MPa and the tensile modulus was 1.65 GPa for the organic dental device and were compared with the synthetic dental device standard given by ASTM D5083. The results of this study are depicted in Table 7.

TABLE 7

Determination of tensile test by using ASTM by ASTM D5083

| Materials | Tensile strength (MPa/kg · m$^3$) | Tensile Modulus (GPa) |
|---|---|---|
| Organic dental device | 95.0 | 1.65 |
| Synthetic dental device | 70-230 (ASTM) | 1.0-3.0 (ASTM) |

Example 8: Chemical Element Test

Chemical element tests, such as Na, K, $CO_3^-$, Cl, Ca, Si, Fe, Pb, Cu, Al, Sn, and Zn, were determined using the EN (166) [European Norm, 166] standardization. Similar results were exhibited when compared to synthetic dental devices. All the elements showed values under the standard. The results of this study are depicted in Table 8.

TABLE 8

Determination of Chemical Element Test by EN (European Standard EN166))

| Chemical Elements (ppm) | Organic dental device | Synthetic dental device |
|---|---|---|
| K | 9.3 ± 0.3b | 10 |
| Na | 5.3 ± 0.2bc | 5 |
| Cl | 0.57 ± 0.02d | 2 |
| CO3− | 157 ± 1.0a | 440-5 |
| Ca | 10.0 ± 0.03a | 10 |
| Si | 3.3 | 5 |
| Fe | 1.8 | 5 |
| Pb | 0 | 5 |
| Cu | 0.5 | 5 |
| Al | 1.6 | 5 |
| Sn | 1.4 | 5 |
| Zn | 1.9 | 5 |

Mean ± standard error (SE, n = 3). Different letters mean the significant difference at a 5% level of significance by LSD test.

Numerous modifications and variations of the present disclosure are possible in light of the above teachings. It is, therefore, to be understood that within the scope of the appended claims, the invention may be practiced otherwise than as specifically described herein.

The invention claimed is:

1. An organic dental device, comprising:
a biobased matrix comprising a nanocomposite, a pigment composition, an organic composition, a polyvinyl chloride mixture, an adhesive component, ZnO nanoparticles, and at least one plasticizer,
wherein the nanocomposite comprises a mixture of olive seed nanocellulose, date seed nanocellulose, fish bone nanocellulose, sheep bone nanocellulose, olive seed nanostarch, date seed nanostarch, fish bone nanostarch, and sheep bone nanostarch,
wherein the organic composition comprises starch, a moringa leaf extract, a chicken-sourced glycerin, fish bone powder and sheep bone powder;
wherein the pigment composition comprises beetroot peel pigment, blueberry pigment and an ajwa date coating,
wherein the adhesive component comprises a cyanoacrylate adhesive, *Acacia arabica* glue, a *Lannea* sp gum, okra gel, aloe vera gel, and jackfruit latex,
wherein the dental device has a molded structure in the form of a dental arch having a plurality of impressions and/or pockets to conform to teeth of a subject, and
wherein the biobased matrix comprises nanoparticles having an average particle size of 20 nm or less.

2. The dental device of claim 1, wherein the polyvinyl chloride mixture further comprises at least one selected from the group consisting of diisononyl phthalate (DINP), diisodecyl phthalate (DIDP), di(2-ethylhexyl) phthalate (DEHP), polypropylene glycol dibenzoate (PGDB), and epoxidized soybean oil (ESBO).

3. The dental device of claim 1, wherein the nanocomposite comprises 15 to 35 wt. % date seed nanocellulose and date seed nanostarch relative to a total weight of the nanocomposite.

4. The dental device of claim 1, wherein the nanocomposite comprises 10 to 30 wt. % olive seed nanostarch and nanocellulose relative to a total weight of the nanocomposite.

5. The dental device of claim 1, wherein the dental device has a tensile strength of 85 MPa/kg·m$^3$ or more.

6. The dental device of claim 1, wherein the dental device has a tensile modulus of 1.5 GPa or more.

7. The dental device of claim 1, wherein the biobased matrix comprises nanoparticles having an average particle size of 16 nm or less.

8. The dental device of claim 1, wherein the dental device has a tensile strength of 95 MPa/kg·m$^3$.

9. The dental device of claim 1, wherein the dental device has a tensile modulus of 1.65 GPa.

10. The dental device of claim 1, wherein the nanocomposite comprises nanostarch having an average particle size of 16 nm or less.

11. The dental device of claim 1, wherein the pigment composition has an amount of carotene of 2 to 4 mg/L.

12. The dental device of claim 1, wherein the pigment composition has an amount of anthocyanin of 3 to 6 mg/L.

13. A method of producing the dental device of claim 1, comprising:
    hydrolyzing a mixture of olive seed, date seed, fish bone, and sheep bone with at least one inorganic acid to obtain the nanocomposite;
    preparing ZnO nanoparticles, then combining the nanocomposite with the organic composition, the ZnO nanoparticles, the adhesive component, the pigment composition, and the polyvinyl chloride mixture to form the biobased matrix; and
    pressing the biobased matrix into a mold and curing to form the dental device.

14. The method of claim 13, wherein the inorganic acid is at least one selected from the group consisting of hydrochloric acid, nitric acid, hydrobromic acid, sulfuric acid, hydrofluoric acid, and phosphoric acid.

15. The method of claim 13, wherein the inorganic acid is sulfuric acid and nitric acid.

16. The method of claim 13, further comprising:
    drying the olive seed, the date seed, the fish bone, and the sheep bone at a temperature of 125 to 145° C. for 1 to 4 h to obtain a mixture comprising nanocellulose and nanostarch of olive seed, date seed, fish bone, and sheep bone.

17. The method of claim 13, wherein the ZnO nanoparticles have an average particle size of 20 nm or less.

18. The method of claim 13, wherein the curing is photocuring or thermal curing.

19. The method of claim 13, wherein the curing comprises curing with a photocuring device for 10 to 30 seconds at a light intensity of 250 to 850 mW/cm$^2$.

20. The method of claim 13, wherein the curing comprises heating at a temperature of 100 to 160° C. for 3 to 6 h.

\* \* \* \* \*